(12) United States Patent
Kanuma

(10) Patent No.: US 6,328,334 B1
(45) Date of Patent: Dec. 11, 2001

(54) SIDE AIRBAG

(75) Inventor: Tadao Kanuma, Shizuoka (JP)

(73) Assignee: Nihon Plast Co., Ltd., Fuji (JP)

( * ) Notice: Subject to any disclaimer, the term of this patent is extended or adjusted under 35 U.S.C. 154(b) by 0 days.

(21) Appl. No.: 09/672,965

(22) Filed: Sep. 29, 2000

(30) Foreign Application Priority Data

Sep. 30, 1999 (JP) .................................................. 11-279569

(51) Int. Cl.[7] .................................................. B60R 21/22
(52) U.S. Cl. ..................................... 280/730.2; 280/743.1
(58) Field of Search ............................. 280/730.2, 730.1, 280/743.1, 743.2

(56) References Cited

U.S. PATENT DOCUMENTS

| | | | |
|---|---|---|---|
| 5,011,183 | 4/1991 | Thornton et al. | 280/743 |
| 5,098,125 | 3/1992 | Thornton et al. | 280/743 |
| 5,336,538 | 8/1994 | Kitamura | 428/35.2 |
| 5,482,317 | 1/1996 | Nelsen et al. | 280/743.1 |
| 5,607,183 * | 3/1997 | Nishimura et al. | 280/743.2 |
| 5,899,491 | 5/1999 | Tschaeschke | 280/730.2 |
| 6,010,149 * | 1/2000 | Riedel et al. | 280/730.2 |
| 6,056,316 | 5/2000 | Yamaji et al. | 280/730.2 |
| 6,170,860 * | 1/2001 | Denz et al. | 280/730.2 |
| 6,199,898 * | 3/2001 | Masuda et al. | 280/730.2 |
| 6,220,625 * | 4/2001 | Wallner et al. | 280/730.2 |
| 6,231,073 * | 5/2001 | White, Jr. | 280/730.2 |
| 6,237,937 * | 5/2001 | Kokeguchi et al. | 280/730.2 |

FOREIGN PATENT DOCUMENTS

| | | |
|---|---|---|
| 2 324 068 | 10/1998 | (GB) . |
| 48-102732 | 12/1973 | (JP) . |
| 50-6034 | 1/1975 | (JP) . |
| 50-7232 | 1/1975 | (JP) . |
| 50-145875 | 12/1975 | (JP) . |
| 1-254446 | 10/1989 | (JP) . |
| 10-109607 | 4/1998 | (JP) . |
| 10-138861 | 5/1998 | (JP) . |

\* cited by examiner

*Primary Examiner*—Paul N. Dickson
*Assistant Examiner*—Faye M. Fleming
(74) *Attorney, Agent, or Firm*—Foley & Lardner

(57) ABSTRACT

A side airbag to be installed around a window of an automotive vehicle to protect a vehicle occupant from impact in a side collision. The side airbag comprises two base cloths which are joined with each other by hollow weave through a linear joining portion which defines a profile of a hollow section. The linear joining portion includes a first straight linear segment part parallel with warp yarns of the base cloths, and a second straight linear segment part parallel with weft yarns of the base cloths. The first and second straight linear segment parts are connected with each other. The linear joining portion includes a step-like section constituted of at least one first straight linear segment part and at least one second straight linear segment part which are connected to each other Additionally, heat-resistant elastomer is coated on the two base cloths including the linear joining portion.

7 Claims, 4 Drawing Sheets

SIDE AIRBAG

BACKGROUND OF THE INVENTION

1. Field of the Invention

This invention relates to improvements in an airbag, and more particularly to the improvements in a side airbag which is light in weight, compact-storable and high in gas-tight sealing characteristics.

2. Description of the Prior Art

Recently, airbag systems have been extensively used for safely protecting vehicle occupants. In the airbag systems, the number of airbags used within a passenger compartment has been increasing, including an airbag for a driver, an airbag for a vehicle passenger on a front seat, a side airbag for protection in side collision and an airbag for a passenger on a rear seat. Of these airbags, attention has been paid particularly on the side airbag for protecting the vehicle occupant from impact in a side collision, in order to further increase safety for the vehicle occupants.

The side airbag is inflated and developed in a narrow space between a vehicular seat and a vehicle body and therefore is required to be small in size and volume while sufficiently protecting the vehicle occupant. Additionally, the side airbag is required not to cause such problems as to unnecessarily inflate during its development thereby not to sufficiently absorb impact energy of the vehicle occupant, or as to strike against the vehicle occupant and provide the vehicle occupant with impact. Particularly, a kind of the side airbag, i.e., an inflatable curtain is required to maintain a high gas-tight sealing ability so that gas cannot leak from the airbag throughout a long time after development of the airbag in order to protect the head of the vehicle occupant even if the vehicle rolls under impact of a side collision. The inflatable curtain is arranged to develop along a side window so as to cover whole or a part of the window in order to protect the vehicle occupant from being injured upon severe striking against the side window or a section around it under impact of the side collision. Furthermore, the inflatable curtain is required to be small in volume and cross-sectional area in its folded state since a space for storing the inflatable curtain is very narrow, for example, around pillars or roof side rails.

A variety of propositions for obtaining airbags to be used as the above side airbag have been made. Japanese Patent Provisional Publication No. 10-109607 discloses an side airbag which is woven as a tubular structure by hollow weave, in which two woven cloths are joined through a joining portion. The whole tubular structure is coated with coating material impervious to gas, thereby obtaining the side airbag of no sewing. This side airbag has a hollow section which is outlined by curved lines. The tubular structure of this side airbag is usually woven by a loom equipped with a jacquard machine as proposed, for example, in Japanese Patent Provisional Publication No. 1-254446. As well known, with the jacquard machine, opening in shedding operation is accomplished by vertically moving a thread for hanging each warp yarn of a cloth, so that a high density cloth for the airbag or the like requires large a large total number of warp yarns. Accordingly, the number of jacquard machines increases as the denier of warp yarns decreases thus raising production cost, while maintenance is required for many hanging threads thus complicating production process.

A proposition for reducing the space in which an airbag is stored has been made by forming the airbag of very thin cloth formed of yarns of lower denier and by folding the airbag compact, as disclosed in U.S. Pat. No. 5,482,317. In this proposition, the airbag is woven using nylon 66 yarns having 45 to 140 denier. The weight of the woven cloth per unit area is considerably low as compared with other conventional cloths for airbags. Here, the mechanical characteristics of the cloth itself is low as compared with other conventional cloths, and therefore the airbag of this proposition is formed to have a rectangular outer peripheral shape so as to make unnecessary sewing at an outer peripheral section thus to ensure a pressure resistance of the airbag. However, it is difficult that the airbag of this proposition is applied to airbags having complicated shapes, such as side airbags.

SUMMARY OF THE INVENTION

It is an object of the present invention to provide an improved side airbag, particularly inflatable air curtain, which is high in gas-tight sealing ability and compact-storable ability.

Another object of the present invention is to provide an improved side airbag which is light in weight and can be produced in a simple method.

According to a first aspect of the present invention, a side airbag to be installed around a window of a vehicle comprises two base cloths which are joined with each other by hollow weave through a linear joining portion which defines a profile of a hollow section. The linear joining portion including a first straight linear segment part parallel with warp yarns of the base cloths and a second straight linear segment part parallel with weft yarns of the base cloths. The first and second straight linear segment parts are connected with each other. The two base cloths are jointed with each other though additional joining portions which are located inside the linear joining portion. The additional joining portions separate the hollow section into a plurality of chambers which are communicated with each other.

According to a second aspect of the present invention, a side airbag to be installed around a window of a vehicle comprises two base cloths which are joined with each other by hollow weave through a linear joining portion which defines a profile of a hollow section. The linear joining portion includes a first straight linear segment part parallel with warp yarns of the base cloths, and a second straight linear segment part parallel with weft yarns of the base cloths. The first and second straight linear segment parts are connected with each other. The linear joining portion includes a step-like or zigzag section constituted of at least one first straight linear segment part and at least one second straight linear segment part which are connected to each other. Additionally, heat-resistant elastomer is applied to the two base cloths including the linear joining portion.

Accordingly, the base cloths of the side airbag is woven into the form of a tubular structure by using the hollow weave. The tubular structure is formed with the hollow section whose profile is defined by the linear joining portion which is constituted of combination of first and second straight linear segment parts which are respectively parallel with warp and weft yarns. As a result, the side airbag is light in weight and readily storable in compact form, while it is excellent in gas-tight sealing characteristics. Additionally, the side airbag can be readily produced in an easy process without a production process using a loom equipped with a jacquard machine which is complicated in structure and high in operational cost.

BRIEF DESCRIPTION OF THE DRAWINGS

In the drawings, like reference numerals designate like parts and elements throughout all figures, in which.

DETAILED DESCRIPTION OF THE INVENTION

Figure 1:
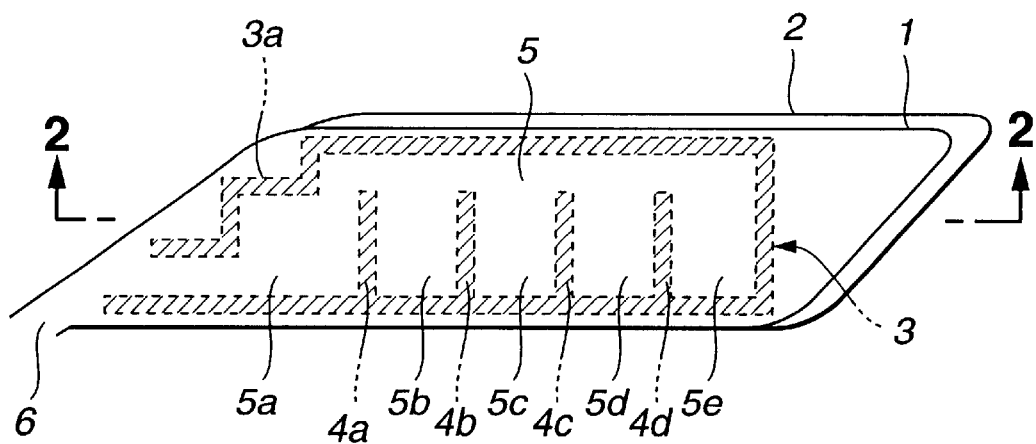
FIG. 1 is a front elevation of a first embodiment of a side airbag according to the present invention, as viewed from the direction of a side window, the side airbag being installed along the side window and in a state before its inflation.

According to the present invention, a side airbag to be installed around a window of a vehicle comprises two base cloths which are joined with each other by hollow weave through a linear joining portion which defines a profile of a hollow section. The linear joining portion includes a first straight linear segment part parallel with warp yarns of the base cloths, and a second straight linear segment part parallel with weft yarns of the base cloths. The first and second straight linear segment parts are connected with each other. The linear joining portion includes a step-like or zigzag section constituted of at least one first straight linear segment part and at least one second straight linear segment part which are connected to each other Additionally, heat-resistant elastomer is applied to the two base cloths including the linear joining portion.

The side airbag of the present invention is composed of the two base cloths which are joined with each other by hollow weave, in which the linear joining portion is generally angularly C-shaped in plan. Additionally, whole the two base cloths including the linear joining portion are subjected to a processing for making them impervious to gas. Accordingly, no sewing step is necessary, making unnecessary sealing processing for sewn parts.

The linear joining portion defining the hollow section has a linear shape formed by combination of a plurality of first straight linear segment parts parallel with the warp yarns of the base cloths, and second straight linear segment parts parallel with weft yarns of the base cloths. Accordingly, a weaving machinery or loom for the base cloths are not required to be complicated so as to effectively producing the side airbag.

The base cloths are joined with each other through a plurality of additional joining portions located inside the generally angularly C-shaped linear joining portion. The additional joining portions may be linear and extend from one side toward another side of the generally angularly C-shaped linear joining portion in a manner to be separate from the another side. Thus, these additional joining portions divide the hollow section into a plurality of chambers; however, these chambers are communicated with each other.

Thus, the hollow section formed by the hollow weave has such a shape as outlined by straight lines. Accordingly, in order to cause the shape of the side airbag to meet the outline of the window, each base cloth located outside the generally angularly C-shaped linear joining portion is woven to extend outward and cut to provide an extended section having a required dimension. The thus formed extended section is provided with an installation portion through which the side airbag is installed to a part of a vehicle body which part is along the window.

Applying whole the base cloths with heat-resistant elastomer is accomplished in such a manner that pressurized gas supplied into the hollow section cannot leak out. For example, such applying is made by coating the elastomer on the whole surface of the base cloths, in which the amount of the elastomer is within a range of from 10 to 50 g/cm$^2$ (calculated as solid content). Otherwise, such applying is made by laminating the elastomer on the whole surface of the base cloths, in which the thickness of the laminated elastomer is within a range of from 20 to 200 μm.

The base cloths are woven preferably by using yarns having not larger than 210 denier, more preferably with yarns having 100 to 200 denier, so that the base cloths of the tubular structure becomes light in weight and thin. Thus, the airbag suitable for inflatable curtains can be provided. In this regard, if the base cloths are woven by using yarns having 420 denier or 315 denier used in conventional airbags, it is impossible to obtain airbags which can be storable compact as being intended by the present invention.

The base cloths of the tubular structure can be woven by a loom equipped with a dobby, without using a loom equipped with a jacquard machine which loom has been used for weaving conventional airbags of a tubular structure. The dobby makes shedding operation for warp yarns by separating the warp yarns into a plurality of groups, so that the dobby is prevented from being large-sized as the jaquard machine even if the total number of the warp yarns increases.

A variety of dobbys have been put into practical use, according to kinds of looms and woven cloths. For example, a crank dobby, a positive cam dobby, a negative cam dobby and the like have been provided for a shuttle loom. A high speed negative cam dobby has been mainly used for a jet loom. A rotary dobby or an electronically operated dobby is also provided for the jet loom.

The heat-resistant elastomer applied to the whole surface of the base cloths are not limited to special ones as far as the elastomer has sufficient physical characteristics such as heat-resistance, adhesion or bonding characteristics with the base cloths, wear-resistance and non-stickiness which are required for the elastomer applying the surface of the base cloths. Examples of method of applying the surface of the base cloths with the elastomer are a) coating method (such as knife coating, kiss roll coating, reverse coating), b) dipping method, and c) printing method (such as screen printing, roll printing, rotary printing). The heat-resistant elastomer may be in the form of solution with organic solvent, emulsion, aqueous solution, or fine powder, prior to be applied to the surface of the base cloths.

The heat-resistant elastomer is not limited to particular ones as far as the above-discussed applying methods can be applied therefor. Examples of the heat-resistant elastomer are silicone resin or rubber-based one, fluorine contained resin or rubber-based one, chlorine contained resin or rubber-based one, polyurethane-based one (including that denatured with silicone or fluorine), epoxy-based one, polyester-based one, polyamide-based one, polyimide-based one, chlorosulfonic one, phenol-based one, acrylic one, or any mixture or copolymer of the above-mentioned ones. Of these, silicone resin-based one, fluorine contained resin or rubber-based one, and polyurethane-based one (including that denatured with silicone) are particularly preferable from the viewpoints of improving mechanical characteristics and heat-resistance of the base cloths or woven cloths.

A variety of conventional additives for improving processing characteristics, adherence characteristics, surface characteristics and durability of the heat-resistant elastomer may be added to the heat-resistant elastomer. Examples of such additives are cross-linking agent, reaction accelerator, reaction retarder, heat-stabilizer, antioxidant, light-stabilizer, age resistor, lubricant, smoothing agent, pigment, water repellent, oil repellent, masking agent such as titanium oxide, brightener, flame retardant, plasticizer, and any combination of the above-mentioned additives.

The heat-resistant elastomer is applied to one surface of each base cloth and may be applied to the both (opposite) surfaces of each base cloth, at opening portions of the woven base cloth, or at a part or whole of clearance between yarns of the woven base cloth.

Additionally, a variety of pretreatment agents for improving adhesion of the heat-resistant elastomer with the base cloths and agents for improving adhesiveness of the elastomer may be added to the heat-resistant elastomer. Additionally, the base cloths may be previously subjected at their surface to pre-treatment such as primer treatment. Further, processing agents for providing heat-resistance, age-resistance, oxidation-resistance and the like may be added to the heat-resistant elastomer. After the heat-resistant elastomer is applied to the base cloths, the heat-resistant elastomer may be subjected to drying, cross-linking, vulcanization and the like upon carrying out hot air drying, contact heat treatment or high energy treatment (using high frequency, electron beam or ultraviolet ray) in order to improve physical properties of the heat-resistant elastomer.

The yarns constituting the base cloths of the side airbag of the present invention are formed of fibers which are not limited to particular ones. Examples of the fibers are polyamide fibers which are formed of nylon 6, nylon 66, nylon 46, nylon 610, nylon 612, copolymer of the above-mentioned nylons, or any mixture of the above-mentioned nylons; polyester fibers which are formed of polyethylene terephthalate, polytrimethylene terephthalate, polybutylene terephthalate, polyethylene naphthalate, copolymer or the above-mentioned polyesters, or any mixture of the above-mentioned polyesters; Aramid fibers typically formed of copolymer of paraphenylene terephthalamide and aromatic ether; aromatic polyester fibers produced using acid which is wholly aromatic compounds; vinylon fibers; polyolefin fibers formed of super high molecular weight polyethylene; vinyl chloride-based fibers; vinylidene chloride-based fiber; fluorine contained resin-based fiber including polytetrafluoroethylene-based fiber; polysulfone fiber; polyphenylene sulfide (PPS)-based fiber; polyetherether ketone (PEEK)-based fiber; polyimide fiber; polyether imide fiber; cellulose-based fiber including super high strength rayon fiber; acrylic fiber; carbon fiber; glass fiber; silicon carbide (SiC) fiber; alumina fiber; or any mixture of the above-mentioned fibers. The yarns may contain inorganic fiber such as metal fiber which is typically formed of steel, if necessary.

A variety of conventional additives for improving spinning characteristics, processing characteristics and durability of the yarns may be added to the yarns. Examples of such additives are heat-stabilizer, antioxidant, light-stabilizer, age resistor, lubricant, smoothing agent, pigment, water repellent, oil repellent, masking agent such as titanium oxide, brightener, flame retardant, plasticizer, or any combination of the above-mentioned additives. The yarns may be subjected to additional twist, bulkiness-providing processing, crimping, or winding.

The dobby used in the loom for weaving the base cloths of the present invention is of the electronically operated type or the mechanically operated type. The loom is selected from a variety of conventional looms for weaving industrial cloths. Examples of such conventional looms are shuttle loom, water jet loom (WJL), air jet loom (AJL), rapier loom, and projectile loom. Woven structure of the base cloths is plain weave, basket weave, twill weave, rip-stop weave, and any combination weave of the above-mentioned weaves.

The side airbag of the present invention is to protect a vehicle occupant inside a passenger compartment from side collision of a vehicle, and therefore stored in its folded state, particularly, at a section of a vehicle body inside the passenger compartment. This section is around a side window of the vehicle, for example, a front pillar, a roof side rail, a center pillar, and rear pillar. The side airbag can be inflated under the influence of gas ejected from an inflator or gas generator at a side collision of the vehicle at which a high load is applied to the side airbag. At this time, the gas from the inflator is supplied into the hollow section defined between the base cloths. Thus, the side airbag is developed in the form of a curtain at a location around the side window and within the passenger compartment (more specifically, in a space below a roof side rail, and from the front pillar, the center pillar or the rear pillar toward a space below the roof side rail). For example, the side airbag of the present invention can be applied to an airbag disposing structure disclosed in Japanese Patent Provisional Publication No. 10-138861.

The side airbag of the present invention is connected to an installation mouth section of the inflator through which gas is ejected into the hollow section of the airbag. A reinforcement cloth is applied to the airbag around the installation mouth section of the inflator. The reinforcement cloth is the same cloth as the base cloths of the side airbag, or may be a separately prepared reinforcement woven cloth which is, for example, formed of nylon 66 yarns having 840 denier, 420 denier or 315 denier. The woven cloth may be singly used having a thickness larger than that of the base cloths, or used in a laminated state where a plurality of the woven cloths are laminated. The reinforcement cloth includes a flame-resistant cloth for isolating high temperature gas from the inflator. In this regard, the reinforcement cloth may be coated with heat-resistant resin such as silicone resin or fluorine contained resin, or heat-resistant rubber in order to provide heat-resistance to the reinforcement cloth. Additionally, the reinforcement cloth may be formed of heat-resistant fiber such as Aramid fiber.

While the principle of the present invention has been shown and described as being applied to the side airbag for protecting a vehicle occupant at a side collision, it will be understood that the side airbag may be used as a functionally operable devices such as a head airbag for protecting the head of a vehicle occupant at a rear-end collision of the vehicle, a mini-airbag for protecting baby or child, and an airbag to be installed to a seat belt, in which the shape and volume of the side airbag is selected to meet the requirements.

FIG. 1 illustrates a first embodiment of the side airbag according to the present invention. The side airbag is composed of the two base cloths 1, 2 which are joined with each other by hollow weave through the generally angularly C-shaped (in plan) linear joining portion 3 which defines the profile of a hollow section 5. The hollow section 5 is to be supplied with high pressure gas from an inflator (not shown). The linear joining portion 3 includes a plurality of first straight linear segment parts parallel with warp yarns of the base cloths, and a plurality of second straight linear segment parts parallel with weft yarns of the base cloths. Each first straight linear segment part and each second straight linear segment part are connected with each other. The linear joining portion 3 includes a step-like or zigzag (in plan) section 3a which corresponds to the shape of a frame of the window. The step-like section 3a is located near one end of the linear joining portion 3 and located at the upper side of the linear joining portion 3.

The base cloths 1, 2 are joined with each other through a plurality of linear additional joining portions 4a to 4d located inside the generally C-shaped linear joining portion 3. The linear additional joining portions 4a to 4d are linear and extend from one (lower) side toward another (upper) side of the generally C-shaped linear joining portion in a manner to be separate from the another side. Thus, these linear additional joining portions 4a to 4d divide the hollow section 5 into a plurality of chambers 5a to 5e; however, these chambers are communicated with each other.

The heat-resistant elastomer is applied to the two base cloths 1, 2 including the linear joining portion 3 so that the side airbag is impervious to gas. The airbag is formed with a gas inlet 6 through which high pressure gas from the inflator is introduced into the hollow section 5 of the side airbag.

Figure 2:
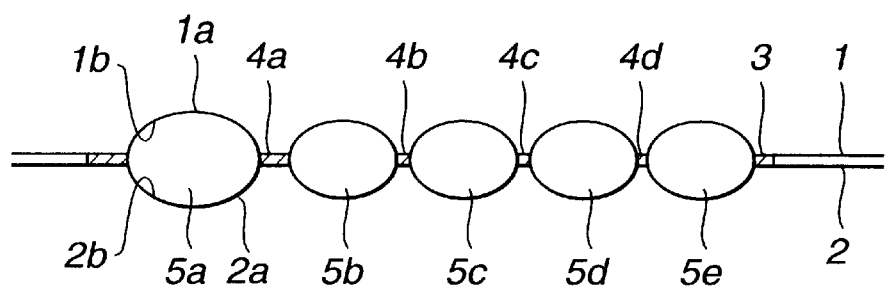
FIG. 2 is a cross-sectional view taken in the direction of arrows substantially along the line 2—2 of FIG. 1, showing the side airbag after its inflation.

The side airbag is inflated as shown in FIG. 2 when high pressure gas is introduced into the hollow section 5, in which each of the chambers 5a to 5e is filled with high pressure gas.

Figure 3:
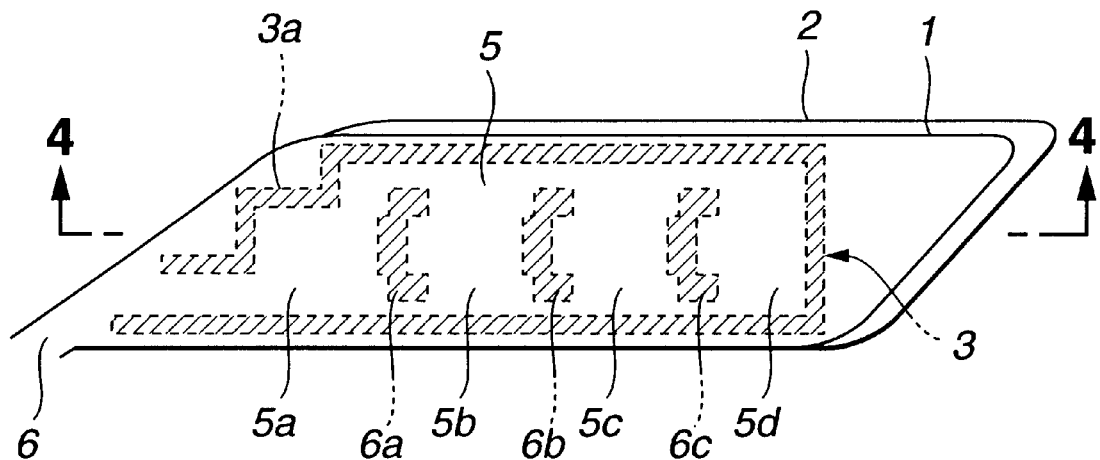
FIG. 3 is a front elevation similar to FIG. 1 but showing a second embodiment of the side airbag according to the present invention.

FIG. 3 illustrates a second embodiment of the side airbag according to the present invention, similar to the first embodiment with the exception that three generally C-shaped (in plan) additional joining portions 6a to 6c are formed in place of the linear additional joining portions 4a to 4d. The additional joining portions 6a to 6c are located inside the generally angularly C-shaped linear joining portion 3 in a manner to be separate from each other and from the linear joining portion 3. The additional joining portions 6a to 6c define four chambers 5a to 5d.

Figure 4:
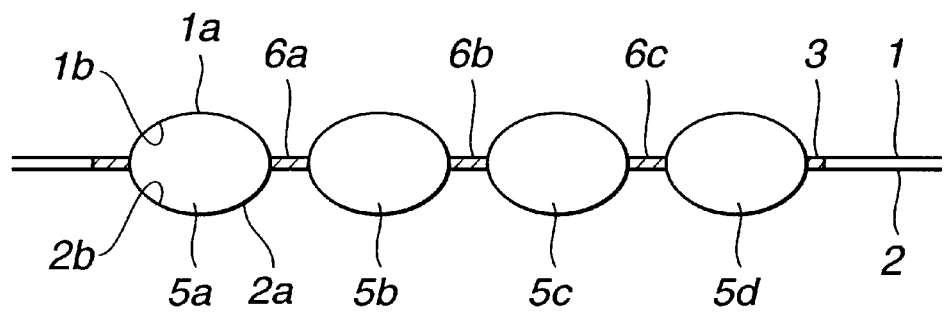
FIG. 4 is a cross-sectional view taken in the direction of arrows substantially along the line 4—4 of FIG. 3, showing the side airbag after its inflation.

The side airbag of this embodiment is inflated as shown in FIG. 4 when high pressure gas is introduced into the hollow section 5, in which each of the chambers 5a to 5d is filled with high pressure gas.

Figure 5:
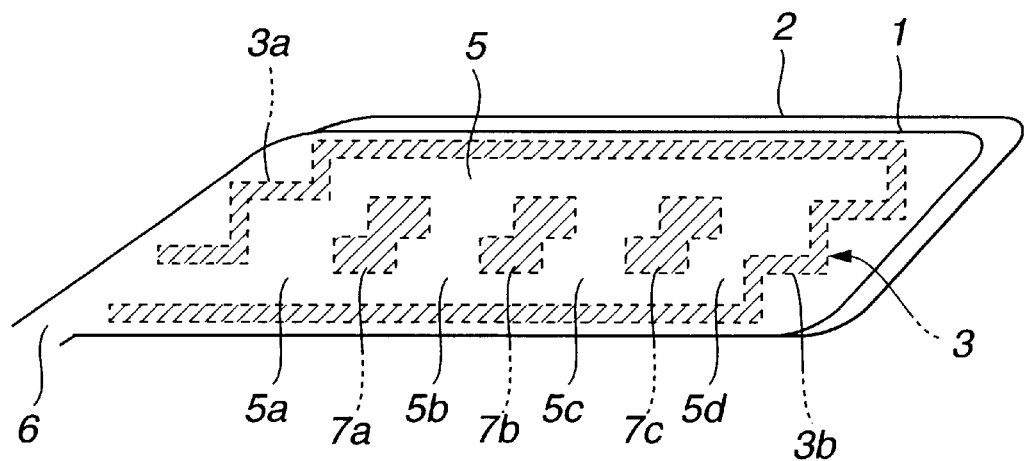
FIG. 5 is a front elevation similar to FIG. 1 but showing a third embodiment of the side airbag according to the present invention.

FIG. 5 illustrates a third embodiment of the airbag according to the present invention, similar to the second embodiment with the exception that three generally Z-shaped (in plan) additional joining portions 7a to 7c are formed in place of the generally C-shaped additional joining portions 6a to 6c. The additional joining portions 7a to 7c are located inside the generally angularly C-shaped linear joining portion 3 in a manner to be separate from each other and from the linear joining portion 3. The additional joining portions 7a to 7c define the four chambers 5a to 5d. In this embodiment, the linear joining portion 3 includes another step-like or zigzag (in plan) section 3b which is located at an intermediate part of the linear joining portion 3 and located at the lower side of the liner joining portion 3. The step-like section 3b is positioned opposite to the step-like section 3a in the lengthwise direction of the airbag.

Figure 6:
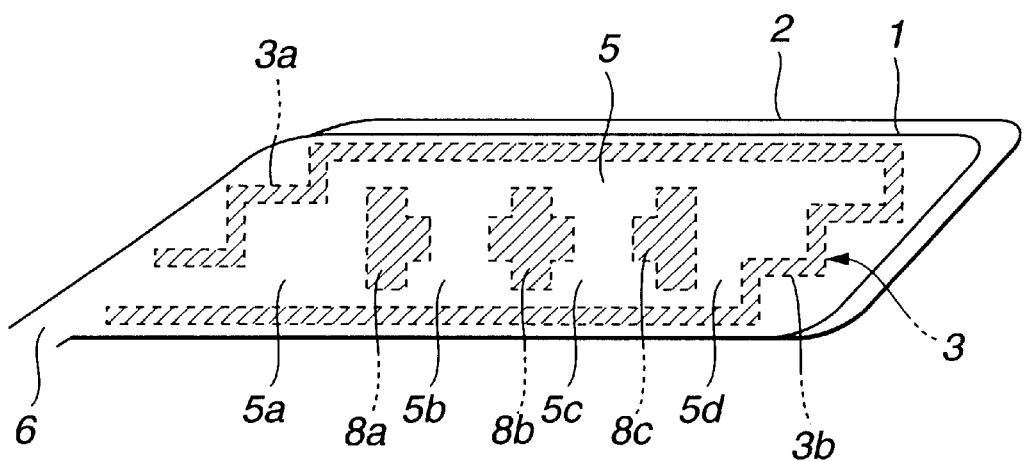
FIG. 6 is a front elevation similar to FIG. 1 but showing a fourth embodiment of the side airbag according to the present invention.

FIG. 6 illustrates a fourth embodiment of the airbag according to the present invention, similar to the third embodiment with the exception that two generally T-shaped (in plan) additional joining portions 8a, 8c, and one generally X-shaped (in plan) additional joining portion 8b are formed in place of the generally Z-shaped additional joining portions 7a to 7c. The additional joining portions 8a to 8c are located inside the generally C-shaped linear joining portion 3 in a manner to be separate from each other and from the linear joining portion 3.

Figure 7:
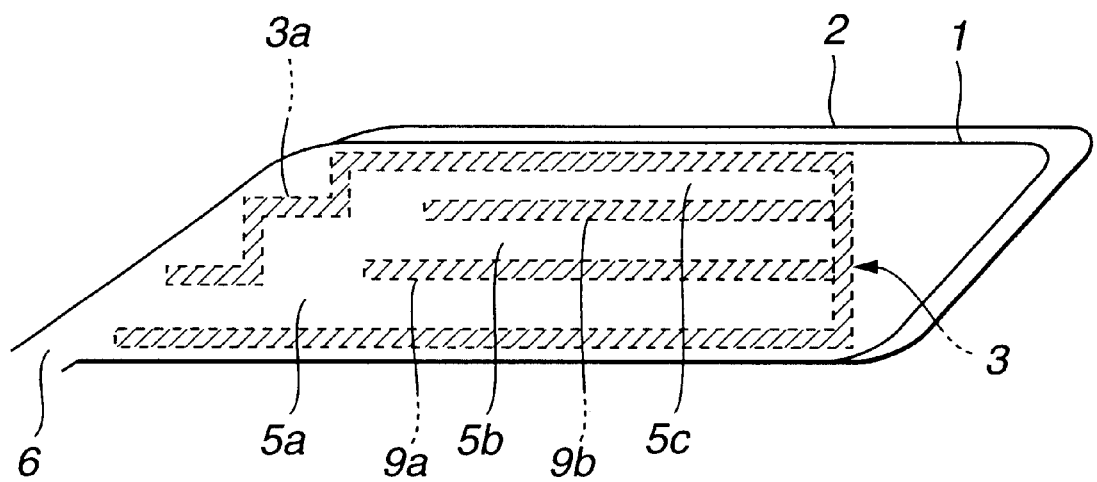
FIG. 7 is a front elevation similar to FIG. 1 but showing a fifth embodiment of the side airbag according to the present invention.

FIG. 7 illustrates a fifth embodiment of the side airbag according to the present invention, similar to the first embodiment with the exception that two linear (lateral) additional joining portions 9a, 9b are formed in place of the linear additional joining portions 4a to 4d in FIG. 1. The two linear (lateral) additional joining portions 9a, 9b are parallel with each other, and extend laterally and parallel with the longitudinal direction of the side airbag. Each linear (lateral) additional joining portion 9a, 9b extends from one (left) side toward the opposite (right) side of the generally C-shaped linear joining portion in a manner to be separate from the opposite (right) side. The additional joining portions 9a, 9b define the three chambers 5a to 5c which are communicated with each other.

EXAMPLES

The present invention will be more readily understood with reference to the following Examples in comparison with Comparative Examples; however, these Examples are intended to illustrate the invention and are not to be construed to limit the scope of the invention.

Example 1

A plain weave tubular structure as shown in FIG. 1 was woven using yarns of nylon 66 fiber by a loom equipped with a dobby. Each of the yarns had a thickness of 140 denier and constituted of 68 filaments, and has a strength of 8.2 g/d (denier). The base cloths 1, 2 of the woven tubular structure had a yarn density of 74 yarns per inch for both the warp and weft yarns. The woven tubular structure was subjected to scouring and to thermal setting. Then, the opposite (upper-side and lower-side) surfaces 1a, 2a (in FIG. 2) of the woven tubular structure was coated with thermosetting type silicone resin in an amount of 25 g/m$^2$ (calculated as solid content), followed by drying and thermal treatment. As a result, the woven tubular structure including the base cloths coated with the resin was obtained, in which the yarn densities of the base cloths was 76 warp yarns per inch and of 75 weft yarns per inch. Thus, a side airbag of Example 1 was produced.

The woven tubular structure had a cloth density of 101 g/m$^2$ before being coated with the resin and of 126 g/m$^2$ after being coated with the resin. The profile of the hollow section 5 of the woven tubular structure was defined by a linear joining portion 3 which was constituted of combination of straight linear segment parts parallel with the warp yarns and another straight segment parts parallel with the weft yarns, as shown in FIG. 1. The linear joining portion 3 was formed into the shape of a deformed trapezoid which has an upper side section of 120 cm, and a lower side section of 170 cm, and a height (vertical distance between the upper and lower side sections) of 45 cm. Four vertically extending joining portions 4a, 4b, 4c, 4d having a length of 30 cm were formed at equal intervals within the hollow section 5, in which each joining portion had a width of 30 mm.

Comparative Example 1

A side airbag of Example 2 was produced in the same manner as that in Example 1 with the exception that each of the yarns of nylon 66 fiber had a thickness of 315 denier and constituted of 72 filaments, and had a strength of 9.5 g/d; the base cloths 1, 2 (in plain weave) of the woven tubular structure had a yarn density of 57 warp yarns per inch and 58 weft yarns per inch; and the woven tubular structure was coated with the thermosetting type silicone resin in an amount of 30 g/m² (calculated as solid content). The woven tubular structure including the base cloths coated with the resin had the yarn densities of the base cloths of 60 warp and weft yarns per inch. The woven tubular structure had the cloth density of 186 g/m² before being coated with the resin and of 216 g/m² after being coated with the resin.

Comparative Example 2

A side airbag of Comparative Example 2 was produced in the similar manner to that in Example 1 with the following exceptions: The base cloths 1, 2 in FIG. 1 were woven as two plain weave cloths which were separate from each other so as not to form the tubular structure. One surface of the woven base cloths was coated with thermosetting type silicone resin in an amount of 25 g/m² (calculated as solid content) to form the base cloths coated with the resin. Then, the base cloths were formed into a tubular structure by sewing them in place of by weaving (as in Example 1). The sewing was carried out using upper and lower yarns of nylon 66 and of yarn number count 20, as follows: An outer peripheral section around the tubular structure was sewn with two lines by double chain stitch (made by two needles), in which the number of operation of needle was 4.5 needles/cm. An inner peripheral section inside the tubular structure was sewn with two lines by lock stitch (made by two needles), in which the number of operation of needle was 5.5 needles/cm. The surface of respective sewn portions and the outside of outer peripheral section (between the base cloths) were sealed with silicone resin of the type where hardening occurred at loom temperature.

Experiment

Evaluation of performance of the side airbag produced in Example and Comparative Examples were made in accordance with the following tests:

(1) Gas-tight Characteristics

A rubber tube was inserted into the gas inlet 6 of the side airbag to which the inflator is connected, maintaining the side airbag in its gas-tight sealing state. The gas inlet 6 was partially sewn. In this state, pressurized air was supplied into the side airbag so that the internal pressure has reached 50 kpa. Thereafter, supply of pressurized air was stopped. Then, a time in which the internal pressure of the airbag decreases to 0 kpa was measured by using a pressure gauge provided near a pressure supply valve. The measured time was represented as a relative comparison value on the assumption that the measured time in Example 1 was 100. This relative value indicates the performance of the gas-tight characteristics.

(2) Thickness upon Folding

The side airbag was folded ten times in zigzag pattern in the longitudinal direction so that a plurality of folded parts overlapped each other. In this state, the thickness of the folded side airbag was measured. The measured thickness was represented as a relative comparison value on the assumption that the measured thickness in Comparative Example 2 was 100. This relative value indicates the performance of the thickness upon folding.

The results of these tests are shown in Table 1.

TABLE 1

| | Base cloths | | | Gas-tight characteristics (relative value) | Thickness upon folding (relative value) |
| --- | --- | --- | --- | --- | --- |
| | Thickness (d = denier) | Weave density (yarns/inch) | Weight (g/m²) | | |
| Example 1 | 140 d | 76 × 75 | 101 | 100 | 89 |
| Comp. Example 1 | 315 | 60 × 60 | 186 | 102 | 206 |
| Comp. Example 2 | 140 | 76 × 75 | 111 | 5 | 100 |

Note:
1) Weave density . . . number (warp yarn) × number (weft yarn)
2) Weight . . . value (g/m²) before being coated with resin As apparent from the test results in Table 1, the side airbag of Example 1 is excellent in gas-tight characteristics and in compact-storable characteristics as compared with conventional side airbag of Comparative Example 2. In contrast, the side airbag of Comparative Example 1 is good in gas-tight characteristics but inferior in compact-storable characteristics. Additionally, the side airbag of Comparative Example 2 (produced under sewing) is inferior in gas-tight characteristics even though sealing processing was made, while it is also inferior in compact-storable characteristics as compared with that of Example 1.

What is claimed is:

1. A side airbag to be installed around a window of a vehicle, comprising:
   two base cloths which are joined with each other by hollow weave through a linear joining portion which defines a profile of a hollow section, said linear joining portion including a first straight linear segment part parallel with warp yarns of said base cloths and a second straight linear segment part parallel with weft yarns of said base cloths, said first and second straight linear segment parts being connected with each other, said two base cloths being joined with each other though additional joining portions which are located inside said linear joining portion, said additional joining portions separating the hollow section into a plurality of chambers which are communicated with each other.

2. A side airbag as claimed in claim 1, wherein said linear joining portion includes a step-like section constituted of at least one first straight linear segment part and at least one second straight linear segment part which are connected to each other.

3. A side airbag as claimed in claim 1, further comprising heat-resistant elastomer applied to said two base cloths including the linear joining portion.

4. A side airbag as claimed in claim 1, wherein said linear joining portion consists of a plurality of first straight linear segment parts parallel with warp yarns of said base cloths, and a second straight linear segment part parallel with weft yarns of said base cloths, each first straight linear segment part being connected with each second straight linear segment part.

5. A side airbag as claimed in claim 1, wherein said linear joining portion is generally angularly C-shaped in plan to define the hollow section, said generally angularly C-shaped linear joining portion consists of only the straight linear segment parts.

6. A side airbag as claimed in claim 1, wherein said base cloths are formed of yarns having not greater than 210 denier.

7. A side airbag as claimed in claim 1, wherein said base cloths are woven by a loom equipped with a dobby.

\* \* \* \* \*